(No Model.)
H. E. FAIRCHILD.
FODDER BINDER.
No. 405,237. Patented June 11, 1889.
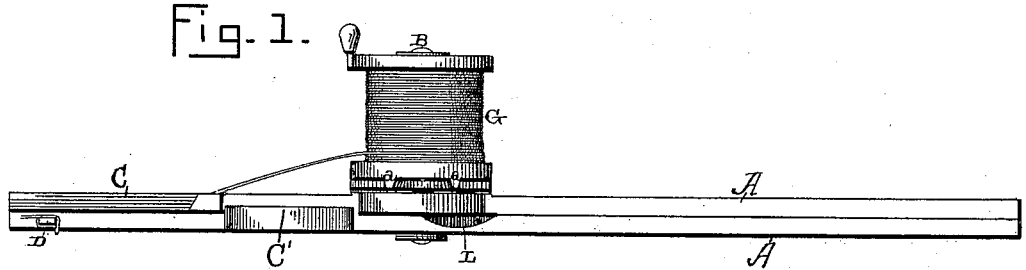
Fig. 1.
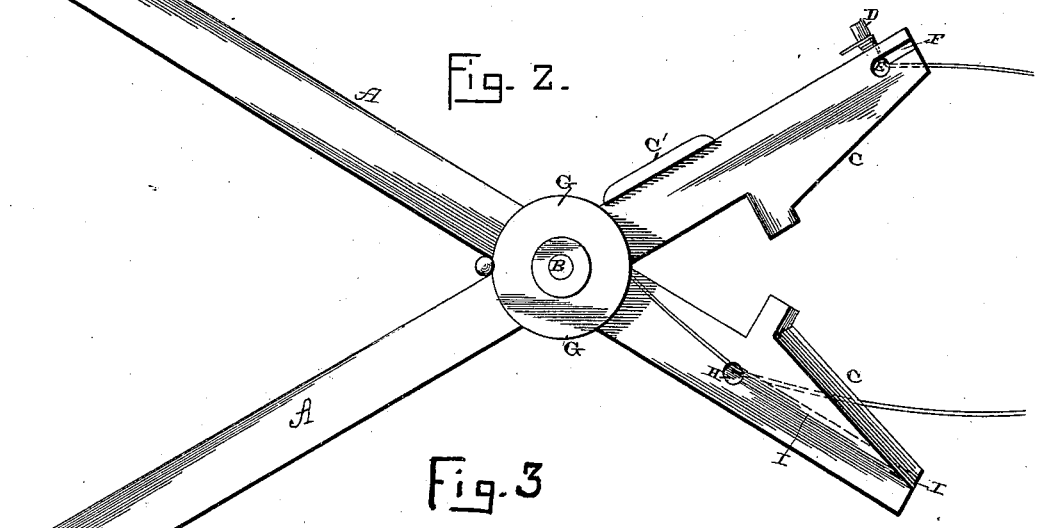
Fig. 2.
Fig. 3
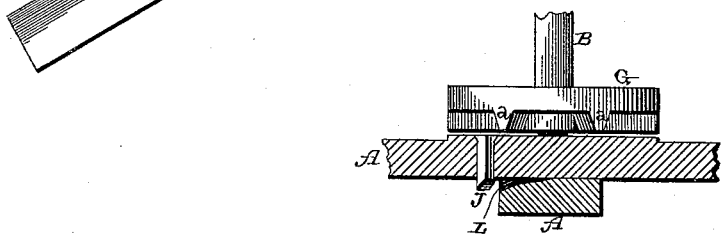
Witnesses:
E. P. Ellis,
L. L. Burket.
Inventor:
Herman E. Fairchild
per J. A. Lehmann,
atty.

UNITED STATES PATENT OFFICE.

HERMAN E. FAIRCHILD, OF DILLER, NEBRASKA.

FODDER-BINDER.

SPECIFICATION forming part of Letters Patent No. 405,237, dated June 11, 1889.

Application filed February 13, 1889. Serial No. 299,774. (No model.)

*To all whom it may concern:*

Be it known that I, HERMAN E. FAIRCHILD, of Diller, in the county of Jefferson and State of Nebraska, have invented certain new and useful Improvements in Fodder-Binders; and I do hereby declare the following to be a full, clear, and exact description of the invention, such as will enable others skilled in the art to which it pertains to make and use it, reference being had to the accompanying drawings, which form part of this specification.

My invention relates to an improvement in fodder-binders; and it consists in the combination of two levers which are pivoted together and provided with cutting-shears, a spool for holding the wire placed upon the pivotal bolt of the levers, and an automatically-operating dog which holds the spool from turning after the wire has been passed around the shock and the levers closed, each of the levers being provided with an opening through which the wire is passed, as will be more fully described hereinafter.

The object of my invention is to provide a simple implement or device by means of which the wire can be passed around a shock, twisted tightly together, and then cut off, whereby the shocks may be quickly and tightly bound.

Figure 1 is a side elevation of a fodder-binder which embodies my invention. Fig. 2 is a plan view of the same, showing the levers separated. Fig. 3 is an enlarged detail view showing the automatically-operating dog.

A represents two levers, which are pivoted together by the bolt or rod B, and which levers are provided with cutting jaws or shears C, for cutting the wire at their shorter ends. One of these levers A is provided with a stop C' on its edge just beyond the pivot B, so as to act as a stop to the movement of the jaws in closing, and upon this same jaw is formed a projection D, around which the free end of the wire is fastened. In the outer end of this same jaw is a hole E, through which the wire passes, and extending from this hole is a groove F, in which the wire sinks, so that when the jaws are closed together the wire will not be injured at this point.

Placed upon the pivot B is a spool G, upon which the binding-wire is placed, and which spool is provided with ratchets or projections a on its under end, so as to be locked in position and prevented from turning when the two levers are closed together and the wire is being twisted around the shock. The wire passes from this spool through the opening H in the top lever, which is provided with a groove I in its under side to receive the wire, so that the wire will not be injured when the levers are closed for the purpose of twisting the wire around the shock.

Passing through the top lever is an automatically-acting dog J, which has its lower end beveled, and which is forced upward toward the spool when the two levers are closed by the inclined surface L on the lower lever. When the levers are opened wide for passing the wire around the shock, the dog is moved away from the inclined surface L on the lower lever, and then it drops from its own gravity, leaving the spool free to be revolved as the wire is drawn outward to be passed around the shock. When the levers are closed, the lower beveled end of the dog strikes against the inclined surface L of the lower lever, and then the dog is forced through its lever, so as to engage with one of the notches or ratchets on the under end of the spool and prevent the spool from revolving while the wire is being twisted tightly around the shock.

In operating my invention the end of the wire is passed from the spool G through the hole H in the top lever, then around the shock, and then through the hole E in the under lever, and its end is then wrapped one or more times around the projection D. The two levers are then closed, so as to bring the wire together, and, as the wire is made to catch in the grooves provided for it in the sides of the levers, the wire is not injured when the levers are closed. The two levers are then rapidly twisted, thereby securing the wires together and tightening the wire around the shock to any desired degree at the same time that the dog is operated, so as to hold the spool and prevent any of the wire from unreeling. As soon as the wire has been twisted sufficiently around the shock the levers are opened and moved so as to catch the twisted wire between the two cutting-edges or shears, where it is severed. As these levers enable any amount of compression to be brought upon the shocks, the shocks can be compressed to any desired degree, and being tightly held together the fodder is kept in a better condition, and the shocks can be more easily handled than when bound in the usual manner.

By means of a device such as is here described a person can operate more rapidly, with greater ease to himself, and with less injury to his hands from the twisting of the wire than can be done by the methods heretofore employed, and at the same time a firmer shock is produced.

I claim—

1. The combination of the two levers A, provided with cutting-edges or shears, holes through which the binding-wire is passed, and a projection on one of the levers to which one end of the wire is fastened, substantially as shown.

2. A shock-binder composed of the two pivoted levers provided with holes through which the wire is passed, grooves extending from these openings to the ends of the jaws and in which the wire is made to catch, a projection D upon one of the jaws, and cutting-edges or shears for severing the wire or cord after it has been twisted around the shock, substantially as set forth.

3. In a shock-binder, the combination of two pivoted levers provided with shears or cutters, and holes through which the wire is passed, with a spool for holding the binding-wire mounted on one of the levers, and a gravity-dog mounted in the same lever for holding the spool while the wire is being twisted, and adapted to be thrown into an engagement with the spool when the levers are closed, substantially as shown.

4. The combination of the two pivoted levers provided with holes through which the binding wire or cord is passed, grooves extending from the holes to the ends of the jaws for the wire to catch in, and cutting-edges or shears upon the levers, a spool for holding the wire, and a locking device for holding the spool from revolving while the wire is being tightened around the shock, substantially as described.

5. In a shock-binder, the combination of two pivoted levers provided with holes through which the wire is passed and a projection upon one of the levers and around which the end of the wire is fastened, a spool upon which the wire is wound, and a device for preventing the spool from unwinding while the wire is being twisted, substantially as set forth.

In testimony whereof I affix my signature in presence of two witnesses.

HERMAN E. FAIRCHILD.

Witnesses:
P. W. PRICE,
PAUL TAROCHELLE.